United States Patent [19]

Powell

[11] 4,004,936
[45] Jan. 25, 1977

[54] LOW TEMPERATURE SEALED GLASS COMPOSITIONS AND PROCESS FOR THEIR PREPARATION

[75] Inventor: Jimmie Lee Powell, Wappingers Falls, N.Y.

[73] Assignee: International Business Machines Corporation, Armonk, N.Y.

[22] Filed: May 19, 1976

[21] Appl. No.: 687,808

[52] U.S. Cl. .............................. 106/53; 106/47 R
[51] Int. Cl.² ...................... C03C 3/10; C03C 3/12; C03C 3/14
[58] Field of Search ............................ 106/53, 47 R

[56] References Cited
UNITED STATES PATENTS

| | | | |
|---|---|---|---|
| 3,841,883 | 10/1974 | Sherk et al. | 106/53 |
| 3,873,330 | 3/1975 | Sherk et al. | 106/47 R |
| 3,904,426 | 9/1975 | Frieser et al. | 106/53 |
| 3,923,530 | 12/1975 | Sherk et al. | 106/53 |
| 3,963,505 | 6/1976 | Dumesnil et al. | 106/47 R |

Primary Examiner—Winston A. Douglas
Assistant Examiner—Mark Bell
Attorney, Agent, or Firm—David M. Bunnell

[57] ABSTRACT

Low temperature, vitreous-crystalline seal glass compositions and a process for their preparation are described. The composition consists essentially of the following constituents in percent by weight:

| | Percent by Weight |
|---|---|
| PbO | 63.5–64.6 |
| $B_2O_3$ | 13.0–13.9 |
| $Bi_2O_3$ | 1.2–1.5 |
| ZnO | 11.4–11.9 |
| $SiO_2$ | 2.4–2.8 |
| $Al_2O_3$ | 0.8–1.0 |
| $Cu_2O$ | 4.3–5.8 |

4 Claims, No Drawings

LOW TEMPERATURE SEALED GLASS COMPOSITIONS AND PROCESS FOR THEIR PREPARATION

The purposes of this abstract is to enable the public and the Patent Office to determine rapidly the subject matter of the technical disclosure of the application. This abstract is neither intended to define the invention of the application nor is it intended to be limiting as to the scope thereof.

BACKGROUND OF THE INVENTION

This invention relates generally to low softening point, low thermal expansion coefficient seal glasses, and more particularly to a composition and process for preparing a copper oxide containing glass useful in forming gas tight glass seals and the glass compositions prepared thereby.

Low softening point, low thermal expansion coefficient, copper containing glass compositions are useful in sealing various surfaces such as ceramics, metal, and glasses and for joining such surfaces together. Such copper glasses are used, for example, to seal together the glass substrates used to form gas display panels. The glasses must have a softening point which will permit the seal to be made at a temperature below the point at which thermal damage will occur to the substrate and which have thermal expansion properties so that it will be compatible with the soda-lime-silica glass conventionally used as substrates in the manufacture of the gas panels.

Low softening temperature copper-oxide containing seal glass compositions and methods for their preparation are described, for example, in U.S. Pat. Nos. 3,873,330, 3,904,426, and in copending application, Ser. No. 572,036, which was filed on Apr. 28, 1975. The glasses are formed from a mixture of oxides including cupric oxide (CuO). One problem associated with making such glasses is the conversion of cupric oxide, CuO, to the cuprous form, $Cu_2O$, during the glass forming process. This is believed to be the cause of the formation of non-homogeneous glasses which contain bubbles, seeds, lumps, and $Cu_2O$ precipitates. These bubbles, seeds, lumps, and precipitates can cause either contamination of the gas panels and/or porous seals to be formed during the sealing process. The aforementioned patents and application address this problem from the standpoint of reducing or avoiding such difficulties by keeping the conversion of the copper oxide from the cupric to the cuprous form to a minimum. The presence of cuprous oxide, in other words, has heretofore been regarded as undesirable.

It has now been found that the problems heretofore associated with the presence of $Cu_2O$ in the sealing glass do not occur if the cupric oxide in the original mixture of oxides is replaced ab initio by cuprous oxide. It also has the additional advantage of producing a sealing glass compositions which have lower softening points than comparable compositions having the copper in the form of cupric oxide.

BRIEF SUMMARY OF THE INVENTION

In accordance with this invention a low temperature vitreous-crystalline seal glass composition is provided which consists essentially of the following constituents in percent by weight:

|  | Percent by Weight |
|---|---|
| PbO | 63.5–64.6 |
| $B_2O_3$ | 13.0–13.9 |
| $Bi_2O_3$ | 1.2–1.5 |
| ZnO | 11.4–11.9 |
| $SiO_2$ | 2.4–2.8 |
| $Al_2O_3$ | 0.8–1.0 |
| $Cu_2O$ | 4.3–5.8 |

The glasses are prepared by forming a mixture of the oxides in the composition, heating the mixture to form a liquid melt, and fining the mixture until a homogeneous melt is obtained. The melt is cooled to form a solid vitreous-crystalline seal glass article having a softening temperature ($T_s$) of from about 400° to 408° C, a glass transition temperature ($T_g$) of from about 370° to 375° C, a strain temperature ($I_{st}$) of from about 309° to 326° C, an annealing temperature ($T_a$) from about 332° to 342° C; and a thermal coefficient of expansion of from about $83 \times 10^{-7}/°C$ to $86.5 \times 10^{-7}/°C$.

DETAILED DESCRIPTION

The glasses described herein consist essentially of the following ingredients in the following proportions in percent by weight:

|  | Percent by Weight |
|---|---|
| PbO | 63.5–64.6 |
| $B_2O_3$ | 13.0–13.9 |
| $Bi_2O_3$ | 1.2–1.5 |
| ZnO | 11.4–11.9 |
| $SiO_2$ | 2.4–2.8 |
| $Al_2O_3$ | 0.8–1.0 |
| $Cu_2O$ | 4.3–5.8 |

A suitable process for forming the glass involves mixing the chemical ingredients together in batch form for about 1 hour, charging the batch to a platinum crucible in its entirety and then increasing the temperature of the batch slowly to about 1090° ± 40° C. The melt is fined at about 1090° C for at least 3½ to no more than 4½ hours. The melt is then quenched in deionized water with nitrogen bubbling through the water. The resulting water-wet, glass cullet is dried in air vented oven for about 8 hours after which the cullet is placed in a platinum crucible and slowly heated to 1090° ± 40° C and fined for an additional hour at that temperature. The melt can then be either poured directly into an aluminum mold from the melt temperature or a billet can be drawn directly from the melt and allowed to cool slowly from the annealing temperature of about 350° C down to room temperature. Glass rods having the desired dimensions and shapes for use in sealing processes can be redrawn from the billet at a temperature of about 435° C. The appearance of the seal rods drawn from the billets is an army green color before reflow. After reflow in forming seals the color of the opaque seal becomes greenish-brown.

Why the problems of glass inhomogeneity is avoided by the subject composition and process is not exactly understood but it is noted that no foaming occurs during the fining of the melt. The copper is already in the form of the cuprous oxide and, therefore, there is no oxygen generation occurring during the fining. The cuprous oxide precipitates in the vitreous-crystalline seal glasses are apparently of such a small size (colloidol) that they do not adversely affect the sealing properties of the glasses.

The glasses of the invention have the following thermal properties:

| | |
|---|---|
| Softening point ($T_s$) | 400 to 408° C |
| Transition point ($T_g$) | 370 to 375° C |
| Strain point ($T_{st}$) | 309 to 326° C |
| Annealing point ($T_a$) | 332 to 342° C |
| Thermal coefficient of expansion (TCE) | |
| $83 \times 10^{-7}/°C$ to $86.5 \times 10^{-7}/°C$ (R.T. – 300° C). | |

The softening point of the glass compositions are lower than comparable compositions which are prepared using cupric oxide as described in copending application Ser. No. 572,036. This permits somewhat milder sealing temperature conditions which provides more flexibility in the sealing process and thermal damage to the substrates is less likely to occur. Another added benefit is the fact that it has been noted that the residual seal stress of seals prepared using the composition of the invention is lower than that of the prior art glasses. The seal stress is of a magnitude of about 1700 – 2100 psi versus seal stresses for prior art cupric oxide glasses of 3000 – 3700 psi. Seals formed from the compositions of the invention therefore are more stable and less susceptible to failure so that panel yield and panel life are improved.

The invention is further illustrated by the following example which is not intended to be limiting.

EXAMPLE

The following chemical ingredients are weighed to the indicated weight percents:

| | |
|---|---|
| PbO | 64.6 |
| $Cu_2O$ | 4.3 |
| $B_2O_3$ | 13.9 |
| $Bi_2O_3$ | 1.5 |
| ZnO | 11.9 |
| $SiO_2$ | 2.8 |
| $Al_2O_3$ | 1.0 |
| | 100.0 |

The chemical ingredients are mixed together in batch form for 1 hour and then charged in their entirety to a platinum crucible. The temperature of the crucible/batch is increased slowly to 1090° ± 40° C and the heating of the melt is continued at that temperature to fine the melt for 4 hours. The melt is quenched by pouring in the deionized water (with nitrogen gas bubbling through the water) directly from the melt temperature. The resulting water wet glass cullet is dried in an air vented oven for 8 hours and then the dry glass cullet is charged to a platinum crucible and the temperature of the crucible/cullet is slowly increased to 1090° ± 40° C and the melt is maintained at that temperature for 1 hour. The melt is poured into an aluminum mold from the melting temperature and allowed to cool slowly from the annealing temperature of 350° C to room temperature. Glass rods are redrawn from the processed billets of the desired dimension and shape for use in sealing together electrode bearing glass substrates to form a gas panel. A suitable process for redrawing the glass rods is to locally heat the billets at the point where the rod is drawn from the billet at a temperature of between about 400° C to 450° C. Rods of from about 35 to 100 mil in diameter are preferred for use in forming gas panel seals.

When used to seal gas panels, 35 mils in diameter rods drawn from the glass composition prepared according to the example produced excellent seals having the required characteristics of thermal expansion softening point strength and were gas tight. The rod color was an opaque army green prior to the sealing process and changed to an opaque greenish-brown apparently due to additional crystallization of the cuprous oxide. The rods and seals appear homogeneous and are free from bubbles, lumps, and seeds.

In order to measure the residual seal stress, a thin strip was cut from the panel lengthwise so that the strip had a thin portion of seal at each end. The seal portion was polished to make it transparent and a polarizing microscope was employed to determine the distance between interference fringes. The seal stress was then calculated by a standard technique and ranged from 1700 – 2100 psi. Comparable seals using the glasses of U.S. Pat. No. 3,873,330 had stresses of 3000 – 3700 psi.

The foregoing has described copper oxide containing low softening temperature vitreous/crystalline sealing glass compositions and methods for their preparation which form a uniform strong seal with low seal stress.

While the invention has been particularly shown and described with reference to the preferred embodiment thereof, it will be understood by those skilled in the art that various changes in form and details may be made therein without departing from the spirit and scope of the invention.

What is claimed is:

1. A low temperature vitreous/crystalline seal glass composition consisting essentially of the following constituents in percent by weight:

| | Percent by Weight |
|---|---|
| PbO | 63.5–64.6 |
| $B_2O_3$ | 13.0–13.9 |
| $Bi_2O_3$ | 1.2–1.5 |
| ZnO | 11.4–11.9 |
| $SiO_2$ | 2.4–2.8 |
| $Al_2O_3$ | 0.8–1.0 |
| $Cu_2O$ | 4.3–5.8 | said composition having a softening temperature of from about 400° to 408° C, a glass transition temperature of from about 370° to 375° C, a strain temperature of from about 309° to 326° C, and annealing temperature of from about 332° to 342° C; and a thermal coefficient of expansion of from about $83 \times 10^{-7}/°C$ to $86.5 \times 10^{-7}/°C$.

2. The composition of claim 1 wherein said composition consists essentially of, by weight, PbO 64.6%, $B_2O_3$ 13.9%, ZnO 11.9%, $Cu_2O$ 4.3%, $SiO_2$ 2.8%, $Bi_2O_3$ 1.5%, and $Al_2O_3$ 1.0%, said composition having a softening temperature of about 400° C, a glass transition temperature of about 373° C, an annealing temperature of about 334° C, a strain temperature of about 311° C, and a thermal coefficient of expansion of about $83.5 \times 10^{-7}/°C$.

3. A process for preparing a low softening temperature vitreous/crystalline seal glass article which is free of lumps and seeds comprising;

forming a homogeneous melt by heating a mixture of constituents consisting essentially of, by weight:

|        | Percent by Weight |
|--------|-------------------|
| PbO    | 63.5–64.6         |
| $B_2O_3$ | 13.0–13.9       |
| $Bi_2O_3$ | 1.2–1.5        |
| ZnO    | 11.4–11.9         |
| $SiO_2$ | 2.4–2.8          |
| $Al_2O_3$ | 0.8–1.0        |
| $Cu_2O$ | 4.3–5.8          | and cooling said melt to form a solid vitreous/crystalline seal glass article having a softening temperature of from about 400° to 408° C, a glass transition temperature of from about 370° to 375° C, a strain temperature of from about 309° to 326° C, and annealing temperature of from about 332° to 342° C.

4. The process of claim 2 wherein said mixture is by weight, PbO 64.6%, $B_2O_3$ 13.9%, Zno 11.9%, $Cu_2O$ 4.3%, $SiO_2$ 2.8%, $Bi_2O_3$ 1.5%, and $Al_2O_3$ 1.0%, and said article has a softening temperature of about 400° C, a glass transition temperature of about 373° C, and annealing temperature of about 334° C, a strain temperature of about 311° C, and a thermal coefficient of expansion of about $83.5 \times 10^{-7}$ /° C.

* * * * *

UNITED STATES PATENT AND TRADEMARK OFFICE
CERTIFICATE OF CORRECTION

PATENT NO. : 4,004,936
DATED : January 25, 1977
INVENTOR(S) : J. L. Powell

It is certified that error appears in the above-identified patent and that said Letters Patent are hereby corrected as shown below:

Claim 4, line 1, change "2" to --3--

Signed and Sealed this

Fourth Day of December 1979

[SEAL]

Attest:

SIDNEY A. DIAMOND

Attesting Officer    Commissioner of Patents and Trademarks